US009838230B2

(12) United States Patent
Gattami et al.

(10) Patent No.: US 9,838,230 B2
(45) Date of Patent: Dec. 5, 2017

(54) PRE-CODING IN A FASTER-THAN-NYQUIST TRANSMISSION SYSTEM

(71) Applicant: Telefonaktiebolaget LM Ericsson (publ), Stockholm (SE)

(72) Inventors: Ather Gattami, Stockholm (SE); Emil Ringh, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/101,047

(22) PCT Filed: Dec. 5, 2014

(86) PCT No.: PCT/EP2014/003259
§ 371 (c)(1),
(2) Date: Jun. 2, 2016

(87) PCT Pub. No.: WO2015/086136
PCT Pub. Date: Jun. 18, 2015

(65) Prior Publication Data
US 2016/0308697 A1  Oct. 20, 2016

Related U.S. Application Data (60) Provisional application No. 61/913,490, filed on Dec. 9, 2013.

(51) Int. Cl.
*H04L 25/497*  (2006.01)
*H04L 25/03*  (2006.01)

(52) U.S. Cl.
CPC ...... *H04L 25/497* (2013.01); *H04L 25/03834* (2013.01)

(58) Field of Classification Search
CPC ............... H04L 1/0057; H04L 1/0071; H04L 25/03834; H04L 25/068; H04L 25/03343; H04L 25/497
See application file for complete search history.

(56) References Cited

U.S. PATENT DOCUMENTS

2011/0188550 A1* 8/2011 Wajcer .................. H04L 25/068
                                                                 375/214
2012/0039380 A1* 2/2012 Schmitt ................. H04L 7/0062
                                                                 375/232
(Continued)

FOREIGN PATENT DOCUMENTS

WO    2010019858 A1    2/2010
WO    2010049858 A2    5/2010

OTHER PUBLICATIONS

Hajela. D., "On Computing the Minimum Distance for Faster than Nyquist Singaling", IEEE Transactions on Information Theory, Mar. 1, 1990, pp. 289-295, vol. 36, No. 2, IEEE.
(Continued)

Primary Examiner — Syed Haider
(74) Attorney, Agent, or Firm — Coats & Bennett, PLLC (57) ABSTRACT

The invention refers to faster than Nyquist communication system wherein a set of symbols is conveyed from a transmitter (21) to a receiver (23), wherein the transmitter (21) and the receiver (23) are coupled by means of a transmission channel (22), comprising a precoder (210) adapted for generating a set of precoded symbols from a set of input symbols by performing a matrix operation with a precoding matrix, a pulse filter (212) adapted for generating a transmission signal to be transmitted over the transmission channel (22) as a function of the precoded symbols, a receiving filter (230) adapted for generating a set of sampled symbols as a function of the transmission signal and noise added by the transmission channel, and a decoder (232) adapted for generating a set of decoded symbols as a function of the set of sampled symbols, wherein the elements of the precoding matrix are dependent on a property of the pulse filter (212), The invention further refers to a transmitter, a receiver and
(Continued)

corresponding methods, and to a user equipment and a base station.

31 Claims, 5 Drawing Sheets

(56) References Cited

U.S. PATENT DOCUMENTS

2015/0098521 A1* 4/2015 Beidas ............... H04B 7/18517
375/296
2015/0110216 A1* 4/2015 Bajcsy ................... H04B 1/40
375/285

OTHER PUBLICATIONS

Saltzberg, B., "Intersymbol Interference Error Bounds with Application to Ideal Bandlimited Signaling", IEEE Transactions on Information Theory, Jul. 1, 1968, pp. 563-568, Vol. IT-14, No. 4, IEEE.

Mazo, J., "Faster-Than-Nyquist Signaling", The Bell System Technical Journal, Oct. 1, 1975, pp. 1451-1462, vol. 54, No. 8, American Telephone and Telegraph Company, US.

Mazo, J., et al., "On the Minimum Distance Problem for Faster-than-Nyquist Signaling", IEEE Transactions on Information Theory, Nov. 1, 1988, pp. 1420-1427, vol. 34, No. 6, IEEE.

Anderson, J., "Faster-Than-Nyquist Signaling", Proceedings of the IEEE, Mar. 14, 2013, pp. 1817-1830, vol. 101, Issue 8, IEEE.

3rd Generation Partnership Project, "3rd Generation Partnership Project; Technical Specification Group Radio Access Network; Base Station (BS) radio transmission and reception (FDD) (Release 12)", Technical Specification, 3GPP TS 25.104 V12.0.0, Jul. 1, 2013, pp. 1-107, 3GPP, France.

Rusek, F., et al., "Non Binary and Precoded Faster Than Nyquist Signaling", IEEE Transactions on Communications, May 1, 2008, pp. 808-817, vol. 56, No. 5, IEEE.

Fredrik Rusek and John B. Anderson, "Non Binary and Precoded Faster than Nyquist Signaling", IEEE Trans. Communications, May 2008, vol. 56, pp. 808-817.†

\* cited by examiner
† cited by third party

PRE-CODING IN A FASTER-THAN-NYQUIST TRANSMISSION SYSTEM

TECHNICAL FIELD

The present invention generally relates a digital transmission system, and more specifically relates to faster-than-Nyquist, FTN, data transmission.

BACKGROUND

The choice of a transmission rate for transmitting consecutive symbols or pulses in today's communication system is commonly based on so-called orthogonality considerations. Subsequent pulses are transmitted at a rate of with an intermediate or delay time T, where T is a time depending on the bandwidth of the pulse, meaning that the symbols can be transmitted at a rate of l/T. The larger the bandwidth the smaller the delay time T. Subsequent pulses are called orthogonal to each other when the delay time T is chosen such that a transmitted symbol can be derived from only the corresponding received pulse; in other words there is no interference of other (nearby symbols), in the following also being referred to as Intersymbol Interference, ISI. The complete impulse response is then fulfilling the so-called Nyquist Intersymbol Interference, ISI, criterion; making a detection and estimation of the symbols at the receiver side particularly easy.

Orthogonality is not fundamentally necessary for communication. It has been found that a tighter symbol rate compared to the Nyquist rate may be possible without any severe transmission degradation. In order to further increase the data rates pulses might be packed tighter in time, which is equivalent to decreasing the delay time T between the Nyquist pulses. Such method is known as faster-than-Nyquist, FTN, signaling. As discussed above, such FTN signaling unfortunately introduces ISI as the pulses are no longer orthogonal. In other words, one symbol will hence affect the perception of other (nearby) symbols.

The first research in this area was carried out by B. Saltzberg, who published an article in 1968 titled "*Intersymbol interference error bounds with application to ideal bandlimited signaling*", IEEE Transactions on Information Theory, vol. 14, no. 4, pp. 563-569, showing how the ISI affects the error probability. In 1975, J. E. Mazo published an article titled "*Faster-Than-Nyquist signaling*", Bell System Technical Journal, vol. 54, no 8, pp. 1451-1462, indicating that the error probability in the FTN case may behave in some sense nice and would not worsen severely symbol detection due to ISI. In an article of J. Mazo and H. Landau, titled "*On the minimum distance problem for faster-than-Nyquist signaling*", IEEE Transactions of Information Theory, vol. 34, no. 6, pp. 1420-1427, 1988; and in an article of D. Hajela, titled "*On computing the minimum distance for faster-than-Nyquist signaling*", IEEE Transactions on Information Theory, vol. 36, no. 2, pp. 289-295, 1990; further proofs with respect to the Mazo assumptions have been provided. The cited articles however do not provide any receiver structure or method to cope with the ISI. In recent years it has been shown and numerically tested that a coding constellation for several different pulses (e.g. so-called sinc and root-raised-cosine pulses) may not induce a loss in minimum Euclidean distance if they are sent faster than the Nyquist ISI criterion allows. This is an indication that an optimal detector such as the Maximum Likelihood estimation (for equal input distribution of the symbols) should not suffer a loss in error rate even if signals are sent FTN (to a certain extent, depending on the pulse). The extent to which the constellation does not suffer any loss is called the Mazo limit. This notion has been extended even to the frequency domain. This means that different frequency channels may be packed tighter thus giving room for more channels.

The problem at hand when using FTN signaling is to provide an efficient coding/receiver structure to be able to perform reliable estimations of the symbols sent in the presence of ISI. Using a (state of the art) matched filter at the receiver, there exists a theoretical solution and an algorithm that solves the problem with minimum error estimation under the ISI that occurs when sending FTN. The Viterbi algorithm as it is called; is based on dynamic programming and is doing a maximum likelihood, ML, estimation of a so-called Hidden Markov Chain. In general performing an ML-estimation (which is optimal for equiprobal input) at the receiver (in a single-input single-output, SISO, channel) with ISI is a so-called non-deterministic polynomial-time, NP, -hard problem. The Viterbi algorithm is of exponential complexity and thus rendering it difficult or even impossible to use in a practical application where the number of symbols with ISI can be high.

FTN can for example be used to compensate for extra spectrum allocations due to non-ideal pulses used in implementation, which in essence translates to a capacity cost. Accordingly, 3GPP TS 25.104, V12.0.0 defines a so-called root-raised-cosine pulse with a roll-off factor of 22% to be used, meaning that the pulse has a frequency leakage of 22% percent compared to an ideal orthogonal pulse scheme, thus leading to an additional capacity of 22% in principal in the ideal case.

SUMMARY

It is an object of the present invention to provide a communication system, a transmitter, a receiver and corresponding methods for performing an efficient data transmission based on a FTN transmission scheme.

This object is achieved by the independent claims. Advantageous embodiments are described in the dependent claims and by the following description.

According to an embodiment, a communication system is provided for conveying a set of symbols from a transmitter to a receiver that are coupled by means of a transmission channel, wherein a transmitter comprises a precoder adapted for generating a set of precoded symbols as a function of the input symbols, and a pulse filter (pulse shaping filter) for generating a (physical) transmission signal to be transmitted over the transmission channel as a function of the precoded symbols. The receiver comprises a receiving filter (matched filter) for generating a set of sampled symbols as a function of the transmission signal (and noise added at/by the transmission channel) and a decoder for generating a set of decoded symbols as a function of the set of sampled symbols.

According to a further embodiment, the precoder performs a matrix operation to transforming a set of n input symbols to a set of n precoded symbols.

According to a further embodiment, the decoder performs a matrix operation to transforming a set of n sampled symbols to a set of n decoded symbols.

According to a further embodiment; the matrix elements of a matrix for performing the matrix operation by the precoder are selected in dependency of a property of the pulse filter (e.g. a property of the impulse response $g_T$ of the pulse filter). The matrix elements may each be further dependent on a compression or acceleration factor $\rho$ used to increase a symbol transmission rate compared to, orthogonal transmission (Faster-Than-Nyquist, FTN transmission).

In an embodiment, the precoder matrix is a function of the matrix G that is defined as follows:

$$G_{m,n} = \int_{-\infty}^{\infty} \sqrt{\rho}\, g_T(t-n\rho T) \cdot \sqrt{\rho}\, g_T(t-m\rho T) dt$$

wherein:
$G_{m,n}$ is a matrix element identified by the m-th row and the n-th column of the matrix G with $1 < n \leq N$ and $1 < m \leq N$ and N being an integer value $>1$,
$g_T$ is a pulse form of the pulse filter,
T is the delay or intermediate time for orthogonal pulse transmission with respect to the pulse form $g_T$, and
$\rho$ is the acceleration factor to be chosen as a value between 0 and 1, e.g. 0.7. 0.75, 0.8, etc.

In an embodiment, the matrix P of the precoder may be derived by calculating an inverse square root of the matrix G:

$P = G^{-1/2}$

Alternatively, the matrix P of the precoder may be derived from the matrix G as follows:

$G = USU^*$ $P = U$ wherein U* denotes the transpose conjugate to U, and S is a singular value matrix (i.e. a positive semi-definite matrix where all matrix elements of S except the elements of the main diagonal equal zero).

In an embodiment, a maximum likelihood estimation is performed with respect to the set of decoded symbols.

In an embodiment, a user equipment, UE, or a radio access node (base station) is provided comprising:
 a precoder adapted for generating a set of precoded symbols as a function of the input symbols,
 a pulse filter adapted for generating a transmission signal to be transmitted over the transmission channel as a function of the precoded symbols.

The UE or radio access node may further or alternatively comprise:
 a receiving filter adapted for generation a set of sampled symbols as a function of the transmission signal (and noise added by the transmission channel), and
 a decoder adapted for generating a set of decoded symbols as a function of the set of sampled symbols.

The present invention also concerns computer programs comprising portions of software codes in order to implement the method as described above when operated by a respective processing unit of appropriate nodes or devices, e.g. a UE or a RAN node. The computer program can be stored on a computer readable medium. The computer-readable medium can be a permanent or rewritable memory within the RAN node or the UE or located externally. The respective computer program can be also transferred to the UE or node for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

In the following, the FTN technique is exemplarily considered for baseband pulse-amplitude. modulation, PAM; however a generalization to pass band quadrature amplitude modulation, QAM is straight forward for a person skilled in the art.

Figure 1:
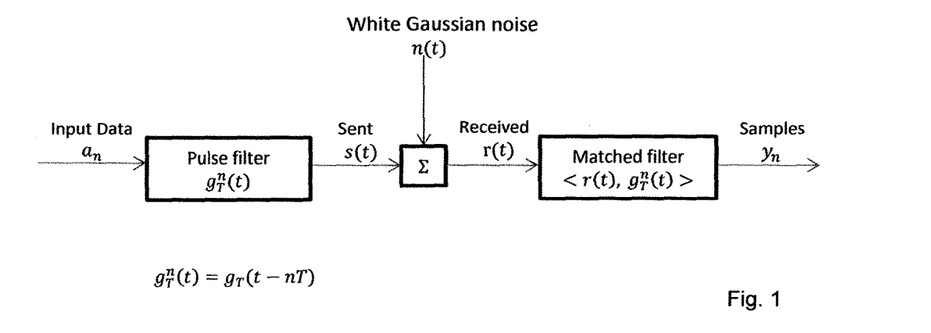
FIG. 1 shows a FTN transmission model according to the prior art.

FIG. 1 shows a principle block diagram for an FTN transmission comprising a pulse filter, a transmission channel and a matched filter. The general idea of FTN is to apply Nyquist pulses of parameter T, but instead of sending them time separated by the corresponding delay time T, the pulses or symbols are separated by $\rho T$, with $0 < \rho < 1$, (i.e. the symbol rate is increase by $1/\rho$ above the Nyquist limit). Consequently the pulse filter generates a signal s(t) based on a set of input values or symbols $a_n$, with $n = 1, \ldots, N$ to be sent on the channel:

$$s(t) = \sum_n a_n \cdot \sqrt{\rho}\, g_T(t - n\rho T)$$

where $\sqrt{\rho}g_T(t-n\rho T)$ is the FTN pulse shape that is normalized to not increase the power transmitted by the sender end (the matched filter is corrected accordingly). The symbols $a_n$ may be taken from a finite alphabet A.

In the following, a model problem is considered in transmitting the signal s(t) based on pulse amplitude modulation, PAM, and sending it over an additive white Gaussian noise, AWGN, channel as shown in FIG. 1. This gives the signal r(t) received at the matched filter:

$r(t) = s(t) + \eta(t)$ where $\eta(t)$ is a stationary, white, Gaussian process.

Thus the pulse filter can be regarded as digital-to-analog converter generating a (physical) transmission signal s(t) based on a set of digital values or symbols $a_n$. Vice versa, the matched filter can be regarded as analog-to-digital converter generating a set of digital values or symbols $y_n$ based on a received (physical) signal r(t).

The matched filter generates a set of samples $y_n$:

$$y_n = \int_{-\infty}^{\infty} r(t) \cdot \sqrt{\rho}\, g_T(t - n\rho T) dt$$

Given the set of samples $y_n$ computed by using a matched filter, the problem may be worded as to estimate set of symbols $a_n$ from the samples $y_n$ with as low probability of error as possible.

According to embodiments of the invention, the structure of the ISI can be derived based on the model described above. From the model above it can be seen that:

$y = Ga + v$

Wherein the elements of the matrix G are formed by the inner products:

$$G_{m,n} = \int_{-\infty}^{\infty} \sqrt{\rho}\, g_T(t - n\rho T) \cdot \sqrt{\rho}\, g_T(t - m\rho T) dt$$

wherein y can be regarded as a vector of the samples $y_n$, a can be regarded as a vector of the sent symbols $a_n$; and v is a Gaussian noise vector with mean 0 and the matrix G can be regarded as covariance matrix. This matrix G is also known as so-called Gram matrix and has properties connected to the pulses used in sending and receiving.

The previous matrix formulation is in turn equivalent to:

$$y = Ga + G^{1/2} n$$

where n is independent, identically distributed (IID), zero-mean, Gaussian noise.

The invention proposes to perform a (digital) precoding in the digital domain at sender side, e.g. to provide a precoding filter in front of the pulse filter. Consequently a corresponding decoding will be performed in the digital domain of the receiver, e.g. after the matched, filter.

Figure 2:
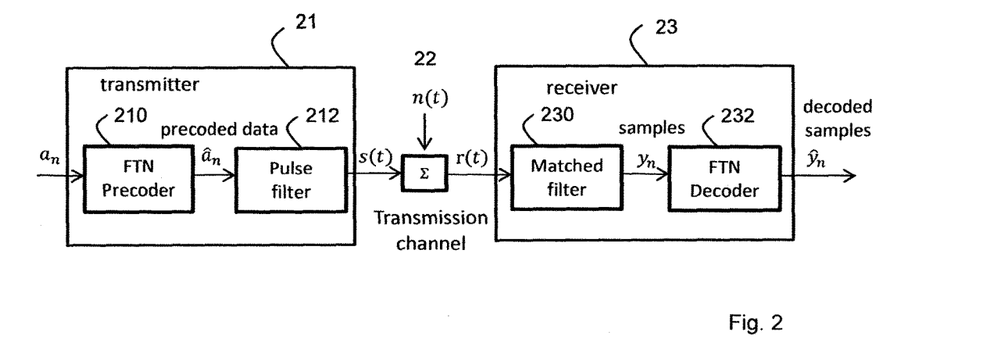
FIG. 2 shows a FTN transmission system comprising a precoder at transmitter side and a decoder at receiver side, FIG. 3 a,b show exemplary measurement plots according to a first embodiment.

FIG. 2 thereto shows a FTN data communication system comprising a transmitter 21, a transmission channel 22 and a receiver 23. The transmitter 21 comprises an FTN precoder 210; and a pulse filter 212. The FTN precoder 210 is adapted to receive a sequence or set of symbols $a_n$, also being referred to as input data, and to generate a set of precoded symbols $â_n$ by means of a first matrix operation:

$$â = Pa$$

wherein a is the vector of the set of n input values, â is the corresponding vector after the precoding, and P is the precoder matrix having a dimension of N×N.

The precoded symbols $â_n$ are fed to the pulse filter 212, that generates a transmission signal s(t) similarly as described under FIG. 1:

$$s(t) = \sum_n â_n \cdot \sqrt{\rho}\, g_T(t - n\rho T)$$

This signal s(t) is transmitted over the transmission channel 22. As assumed above; white Gaussian noise is being added by the transmission channel, such that the receiver 23 receives the following signal:

$$r(t) = s(t) + \eta(t)$$

where $\eta(t)$ is a stationary white Gaussian noise process.

The receiver 23 comprises a matched filter 230 as described under FIG. 1 to generate a set of precoded sampled symbols $y_n$.

$$y_n = \int_{-\infty}^{\infty} r(t) \cdot \sqrt{\rho}\, g_T(t - n\rho T) dt$$

This set of sampled symbols is fed to a FTN decoder 232 that generates a set of decoded symbols $ŷ_n$. The equation vector form reads as follows:

$$ŷ = Dy$$

wherein D is the decoder matrix having a dimension of N×N.

The invention can thus be regarded as providing a separate layer to the well-known "matched filter system"; the additional layer comprising the precoding at the transmitter side and the corresponding decoding at the receiver side to enhance the performance in the case of ISI. This allows any operations, e.g. interleaving, coding (as the WCDMA-coding discussed in the following), or any other pre-/post-processing to further enhance the communication to function as known in the prior art.

In an embodiment, a square root inverse precoding is performed, in the following also being referred to as G-to-minus-half, GTMH precoding.

The GTMH precoding matrix operation in the FTN precoder can be written as follows:

$$â = \sqrt{\rho}\, G^{-1/2} a$$

wherein $\sqrt{\rho}$ therein is simply a scaling factor in order to provide energy-neutral equations.

Thus, the previous system at the receiver reduces to:

$$y = G^{1/2}(\sqrt{\rho}\, a + n)$$

where n is a normal Gaussian vector that is zero-mean, uncorrelated, and has standard deviation only depending on the signal-to-noise ratio, SNR. Applying a corresponding decoding with $G^{-1/2}$ at the receiver side, the vector of the decoded samples (i.e. the set of values $ŷ_n$ measured at the output of the GTMH decoder) can be written:

$$ŷ = G^{-1/2} y = \sqrt{\rho}\, a + n$$

This may hence be solved without correlating and increasing the noise. In other words, implementing a precoder as discussed above allows to constructing an equalizer for the ISI without amplifying the noise.

A ML-estimation may be applied to ŷ, e.g. using any known estimation algorithm for the ISI-free case.

Figure 3A:
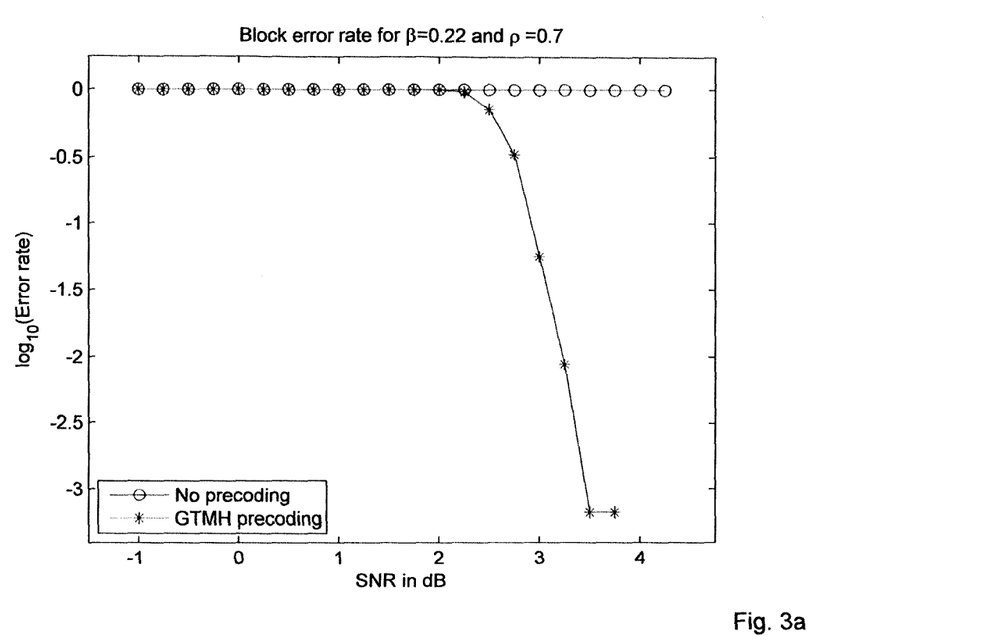
Figure 3B:
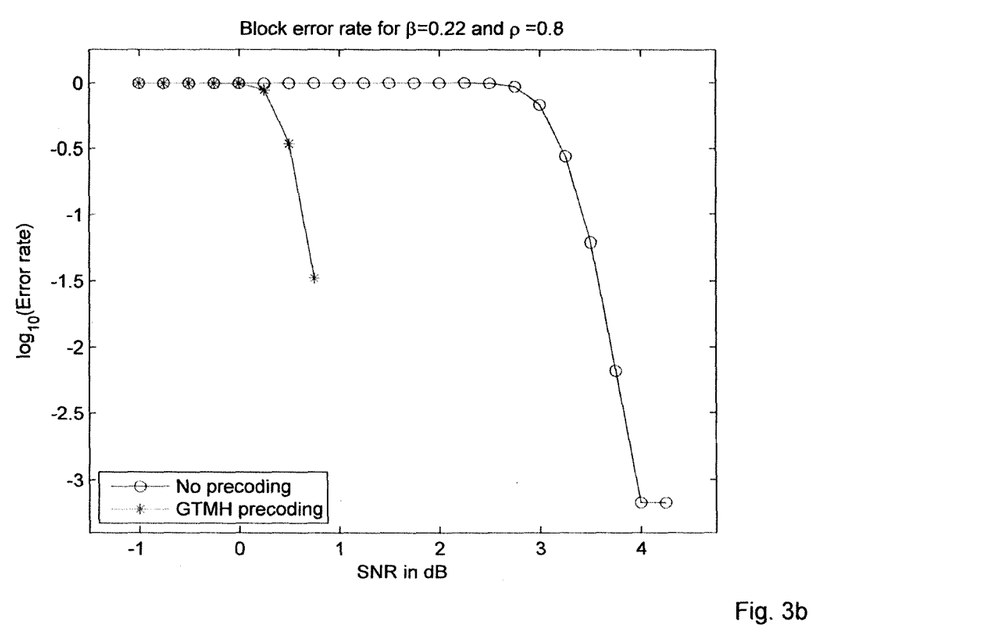

FIG. 3a and FIG. 3b show exemplary plots as results of simulations performed with a WCDMA-turbo code. The plots illustrate a block-error probability versus the SNR in dB for two different values of ρ, i.e. for ρ=0.7 in FIG. 3a and ρ=0.8 in FIG. 3b. Both plots show the block-error probability each with GTMH-precoding and without GTMH-precoding. The simulation for both plots has been performed with N=6000 bits (4000 bits carrying data and 2000 bits forming redundancy bits for the WCDMA-coding) that has been coded with wide band CDMA turbo cording. Further, the root-raised-cosine pulse with roll-off factor of 22% as discussed in the background section has been used by way of example.

It can be seen from both figures that when using the GTMH-precoding the error rates drops dramatically. In FIG. 3b it can be seen that in order to get the same performance from the non-precoded system, we have to increase the SNR about 2.5 dB (GTHM-precoding has approximately the same error rate at about 4.5 dB as the non-precoded system has around 7 dB). For the even tighter case with ρ=0.7 as shown in FIG. 3a, it can be seen that the GTMH-precoded case works error free at SNR=6 dB whereas at 6 dB the non-precoded case does not seem to get any block right (error rate=10°=1).

In the following an embodiment according to the GMTH precoding as described above is discussed.

Generally, the square root of a matrix is not unique, and hence there are different ways of computing it having different properties; one such way is the so-called Cholesky factorization. According thereto, a positive definite matrix G can be decomposed as:

$$G = LL^T$$

wherein L is a lower triangular matrix, meaning that all matrix elements above the main diagonal of the matrix L equal zero:

$$L = \begin{pmatrix} L_{1,1} & 0 & 0 & \cdots & 0 \\ L_{2,1} & L_{2,2} & 0 & \cdots & 0 \\ L_{3,1} & L_{3,2} & L_{3,3} & \cdots & 0 \\ \vdots & \vdots & \vdots & \ddots & \vdots \\ L_{N,1} & L_{N,2} & L_{N,3} & \cdots & L_{N,N} \end{pmatrix}.$$

The idea of this embodiment is to use $G^{-1/2}=L^{-1}$ in the decoder.

This allows a decoding at the receiver side on the fly. For a block length of N bits the equation system at the receiver side can be written:

$$L\hat{y} = \begin{pmatrix} L_{1,1} & 0 & 0 & \cdots & 0 \\ L_{2,1} & L_{2,2} & 0 & \cdots & 0 \\ L_{3,1} & L_{3,2} & L_{3,3} & \cdots & 0 \\ \vdots & \vdots & \vdots & \ddots & \vdots \\ L_{N,1} & L_{N,2} & L_{N,3} & \cdots & L_{N,N} \end{pmatrix} \begin{pmatrix} \hat{y}_1 \\ \hat{y}_2 \\ \hat{y}_3 \\ \vdots \\ \hat{y}_N \end{pmatrix} = \begin{pmatrix} y_1 \\ y_2 \\ y_3 \\ \vdots \\ y_N \end{pmatrix} = y.$$

Thus as soon as $y_1$ is received we can compute $\hat{y}_1$ as $\hat{y}_1 = y_1/L_{1,1}$. Then by forward substitution we can, as soon as $y_2$ is received, directly compute $\hat{y}_2$ as:

$$\hat{y}_2 = y_2/L_{2,2} - \hat{y}_1 \cdot L_{2,1}/L_{2,2}.$$

The decoding can then continue with $\hat{y}_3$ as:

$$\hat{y}_3 = y_3/L_{3,3} - \hat{y}_1 \cdot L_{3,1}/L_{3,3} - \hat{y}_2 \cdot L_{3,2}/L_{3,3}$$

This pattern is then repeated throughout the whole process until $y_N$ is received and $\hat{y}_N$ is computed. The decoding can thus be made on the fly and the precoding matrix $L^{-1}$ does not have to be explicitly computed.

The receiver can thus continuously decode the bits one at the time, every time it gets a sample. The time saving comes from the fact that instead of waiting until all the N samples are received and then compute $\hat{y}=G^{-1/2}y$ it is possible to start to compute $\hat{y}$ directly. Thus the receiver can get a continuous workload instead if just waiting for all the bits of one block to be received before it can start the decoding. Hence when the N-th bit is received all that is left is N elementary operations (addition, subtraction, multiplications and divisions) to compute $\hat{y}_N$, instead of a matrix-vector multiplication that is $O(N^2)$ elementary operations.

The memory usage is only $N^2/2$ which is only half of the memory to be used for processing a normal matrix; further the corresponding decoding at the receiver side will be essentially less power consuming, as significant fewer operations are needed compared to using a full matrix.

This is particularly advantageous if the receiver is a handheld device, e.g. a mobile terminal or user equipment, UE, where battery consumption is sought to be minimized.

Consequently, the precoder applies the inverse matrix $L^{-T}$ which is an upper triangular matrix. Thus, the precoder performs the following operation:

$$\hat{a} = L^{-T}a.$$

Differently to the decoder side, the transmitter has to wait for all the n bits of the block in order to generate the signal; this may be however well acceptable as anyhow usually further operations such as interleaving and turbo coding have to be performed on a set of symbols before transmitting the actual signal.

In the following, a further embodiment, hence forth being referred to as singular value decomposition, SVD, precoding will be described; that may be as well implemented in a UE or base station as described above.

Similarly to the above-described examples, SVD precoding exploits the structure of the ISI rather than regarding it as noise. Instead of using the communicated bits a∈A as the amplitudes for PAM signaling, the following precoded bits are provided as amplitudes:

$$\hat{a} = Ua$$

Wherein the matrix U relates to a singular values decomposition of the above-described matrix G:

$$G = USU^*$$

where $U^*$ denotes the transpose conjugate to U and S the singular value matrix (with all matrix elements of S except the elements of the main diagonal equal zero).

At the receiver end the system reduces hence to:

$$y = USa + U\sqrt{S}\hat{n}$$

where $\hat{n}$ is still a normal Gaussian vector that is zero-mean, uncorrelated, and has standard deviation only depending on the SNR, and $\sqrt{S}$ is just a diagonal matrix comprising the square roots of the singular values of S on the main diagonal. This may hence be solved without correlating and increasing the noise. The measured vector $\hat{y}$ (i.e. the set of values $y_n$ measured at the output of the SVD decoder) can be written as follows:

$$\hat{y} = U^* y = Sa + \sqrt{S}\hat{n}$$

Similarly to the GTMH precoding described above, a final maximum-likelihood, ML-estimation can be applied to the measured vector $\hat{y}$ and using any estimation algorithm known in the art for the ISI-free case.

Figure 5A:
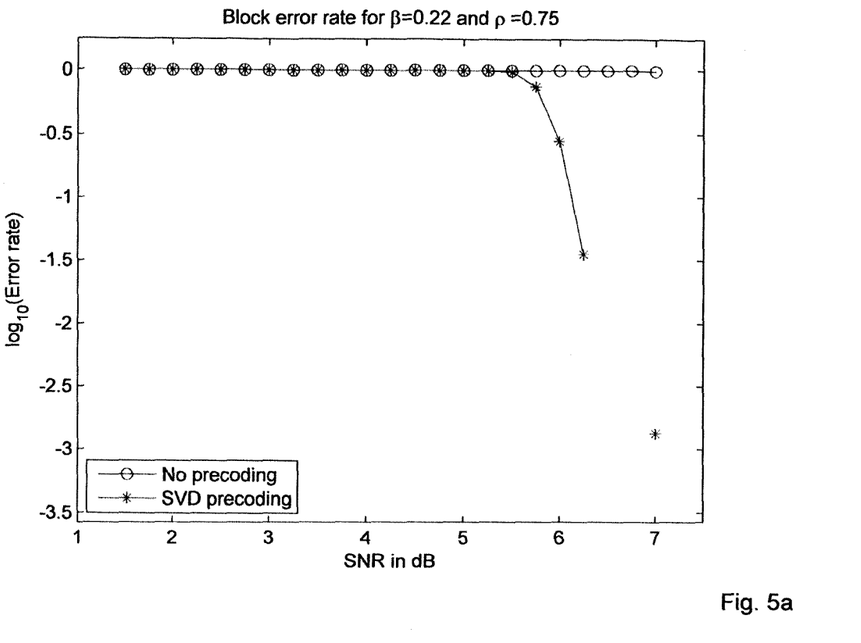
Figure 5B:
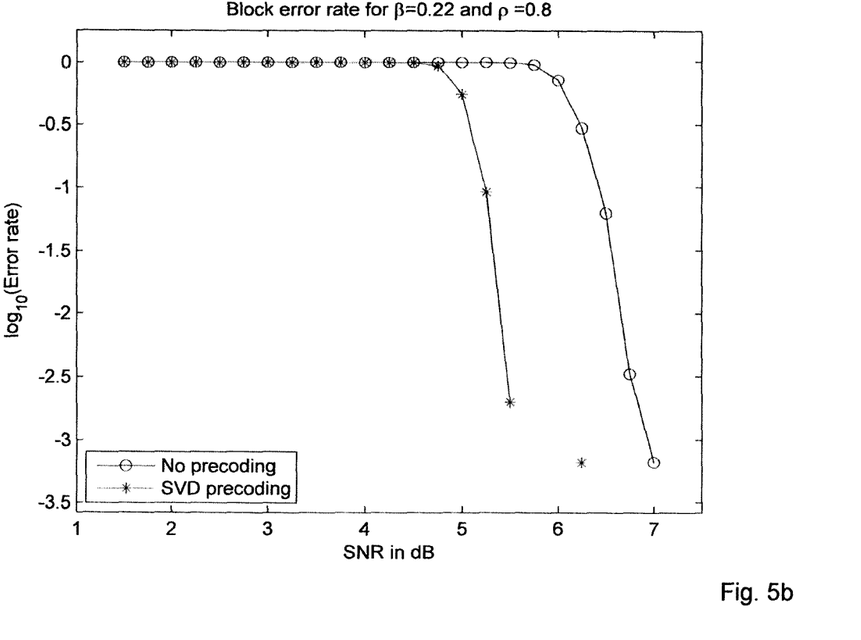

In the following, FIG. 5a and FIG. 5b show exemplary plots as results of simulations performed with a WCDMA-turbo code. Similarly to above-described FIG. 3a and FIG. 3b, the plots of FIG. 5 and FIG. 5b illustrate a block-error probability versus the SNR in dB for two different values of ρ, i.e. for ρ=0.75 in FIG. 5a and ρ=0.8 in FIG. 5b. In each plot, results are shown without any precoding and with SVD-precoding. This is exemplified by using the same pulse, block length (N=6000), and same code rate for the turbo code, as in the GTMH example above.

It can be seen from both figures that when using SVD-precoding the error rates drops significantly. As can be seen in FIG. 5a, in order to get the same performance from the non-precoded system the SNR has to be increased about 1 dB (SVD-precoding has approximately the same error rate at about 5.5 dB as the non-precoded system has around 6.75 dB). For the even tighter case with ρ=0.75 as shown in FIG. 5b, it can be seen that the SVD-precoded case performs error free at SNR=6.5 dB whereas at 6.5 dB the non-precoded case has an error rate very close to $10^0=1$.

Figure 4:
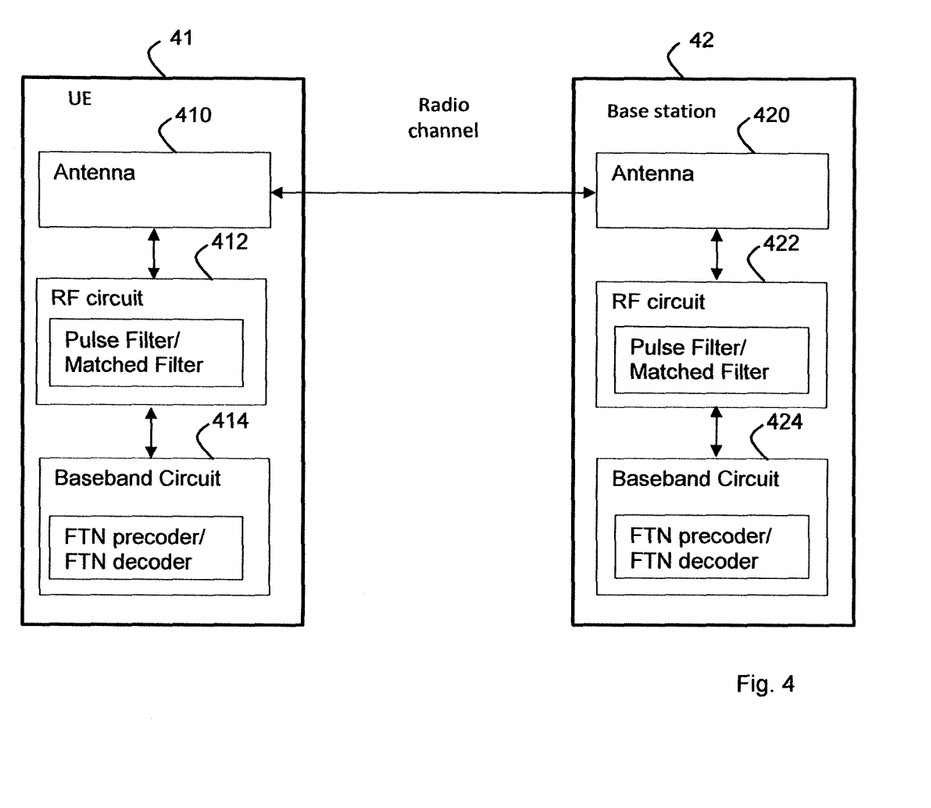
FIG. 4 shows an exemplary communication system comprising a UE and a base station, FIG. 5 a,b show exemplary measurement plots according to a second embodiment.

FIG. 4 illustrates an application of afore-mentioned embodiments into a radio communication system. By way of example, a UE 41 according to 3GPP Long-Term Evolution, LTE, communicates with a base station 42, e.g. an eNodeB of an access network over a radio channel according to 3GPP LTE. Both the UE 41 and the base station 42 have a first baseband domain or circuit 414 and a second baseband circuit 424 respectively, adapted for baseband processing, and a first radio frequency, RF, domain or circuit 412 and a second RF circuit 422 respectively, each for signal generation and reception in the radio frequency domain.

The UE 41 may comprise a pulse filter 212 and a matched filter 230 according to above-described embodiments being integrated in the first RF circuit 412, and an FTN precoder 210 and an FTN decoder 232 according to above-described embodiments being integrated in the first baseband circuit 414.

As well, the base station 42 may comprise a pulse filter 212 and a matched filter 230 according to above-described embodiments being integrated in the second RF circuit 412, and an FTN precoder 210 and an FTN decoder 232 according to above-described embodiments being integrated in the second baseband circuit 414.

Figure 6:
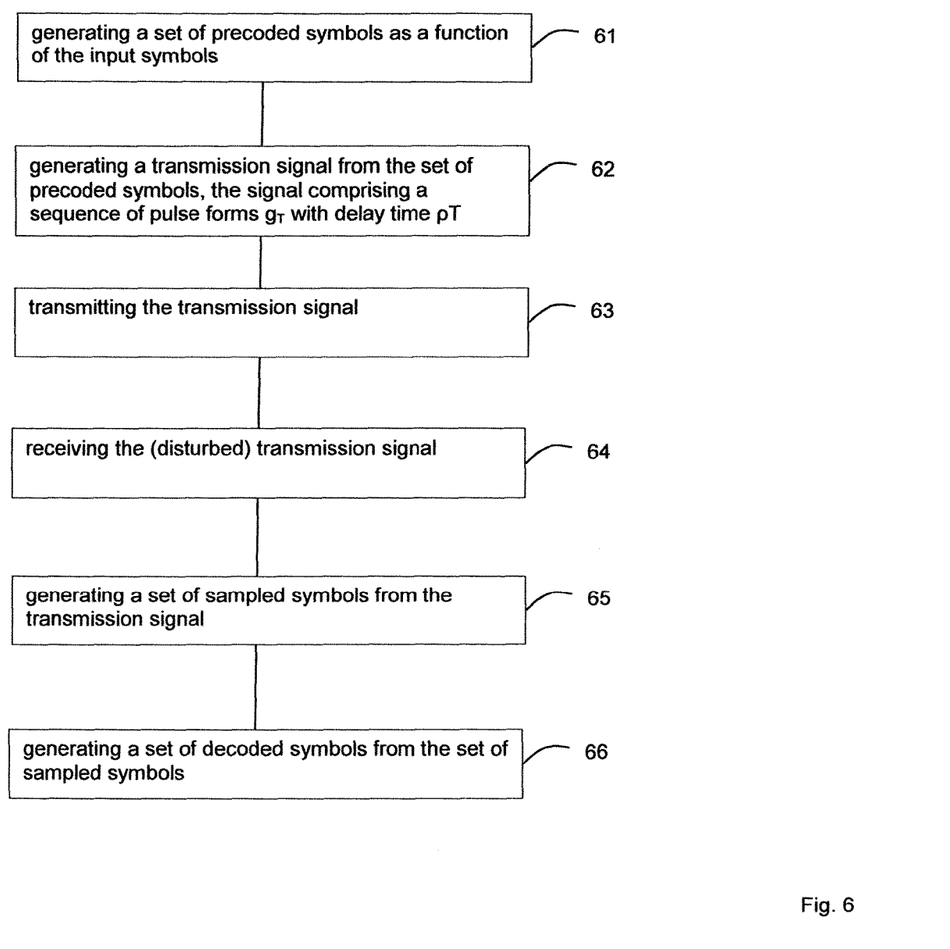
FIG. 6 depicts a method with principle method steps being performed in a transmitter and a receiver.

FIG. 6 shows a principle sequence of steps to be performed in a transmitter (21) and a receiver (23) of FIG. 4 as discussed above:

In a first step 61, a set of precoded symbols is generated as a function of the input symbols by performing a matrix operation with a precoding matrix.

In a second step 62, a transmission signal is generated comprising a sequence of pulse forms $g_T$ with amplitudes according to the set of precoded symbols, wherein the pulses are separated by the time distance $\rho T$, wherein T is an intermediate time for orthogonal pulse transmission (Nyquist boundary) with respect to the pulse form $g_T$, and $\rho$ is a value between 0 and 1, and wherein the matrix elements of the precoding matrix are selected in dependency of a property of the pulse form $g_T$.

In a third step 63, the transmission signal is transmitted over a transmission channel.

In a fourth step 64, the transmission signal is received (disturbed by noise) at a receiver filter.

In a fifth step 65, a set of sampled symbols is generated from the transmission signal (by means of a matched filtering), and in a sixth step 66, a set of decoded symbols is generated from the set of the sampled symbols by means of operation with a decoding matrix, wherein the matrix elements of the decoding matrix are selected in dependency of a property of the pulse form.

The invention claimed is:

1. A faster than Nyquist communication system adapted for conveying a set of symbols from a transmitter to a receiver, wherein the transmitter and the receiver are coupled by means of a transmission channel, comprising the following circuits:
   a precoder configured to generate a set of precoded symbols from a set of input symbols by performing a matrix operation with a precoding matrix;
   a pulse filter configured to generate a transmission signal to be transmitted over the transmission channel as a function of the precoded symbols, the transmission signal comprising a sequence of pulses having a pulse form $g_T$, wherein the pulses are separated by a time distance $\rho T$, wherein T is an intermediate time for orthogonal pulse transmission with respect to the pulse form $g_T$, and $\rho$ is an acceleration factor having a value between 0 and 1;
   a receiving filter configured to generate a set of sampled symbols as a function of the transmission signal and noise added by the transmission channel;
   a decoder configured to generate a set of decoded symbols as a function of the set of sampled symbols;
   wherein the elements of the precoding matrix are dependent on a property of the pulse form $g_T$.

2. The communication system of claim 1, wherein the decoder is configured to generate the set of decoded symbols by performing a matrix operation with a decoding matrix, wherein the elements of the decoding matrix are dependent on the receiving filter.

3. The communication system of claim 1, wherein the matrix elements of the precoding matrix are further dependent on an acceleration factor $\rho$, the acceleration factor being adapted to be used by the pulse filter to decrease the symbol delay time below the Nyquist delay time, wherein the acceleration factor $\rho$ is a value between 0 and 1.

4. The communication system of claim 1, wherein the pulse filter is configured to perform the following operation onto a number of N input symbols $a_n$:

$$s(t) = \sum_n a_n \cdot \sqrt{\rho}\, g_T(t - n\rho T).$$

5. The communication system of claim 4, wherein the matrix of the precoder is derived form a matrix G, the matrix elements of the matrix G being calculated as:

$$G_{m,n} = \int_{-\infty}^{\infty} \sqrt{\rho}\, g_T(t - n\rho T) \cdot \sqrt{\rho}\, g_T(t - m\rho T)\,dt$$

with $1 \leq n \leq N$ and $1 \leq m \leq N$ and N being an integer value >1.

6. The communication system of claim 5, wherein the matrix of the precoder is an inverse square root matrix $G^{-1/2}$ of the matrix G.

7. The communication system of claim 6, wherein the receiving filter is matched to the pulse filter, and wherein both the precoding matrix and the decoding matrix are inverse square root matrices G−1/2 of the matrix G.

8. The communication system of claim 7, wherein the precoder matrix and the decoder matrix are derived from a decomposition of the matrix G with $G = L\,L^T$, wherein L is a lower triangular matrix with all matrix elements above the main diagonal being zero and $L^T$ is a transpose conjugate matrix to the matrix L, wherein the precoder is adapted to apply an inverse matrix $L^{-T}$ of the transpose conjugate matrix $L^T$, and the decoder is adapted to apply an inverse matrix $L^{-1}$ of the lower triangular matrix L.

9. The communication system of claim 5, wherein the matrix P of the precoder relates to the matrix G as follows:

$G = PSP^*$ wherein P, P* and S are matrixes, wherein the matrix P* denotes the transpose conjugate to the matrix P, and the matrix S is a singular value matrix, wherein all matrix elements except the elements of the main diagonal equal zero.

10. The communication system of claim 1, wherein the decoder is adapted to perform a matrix operation for transforming a set of n sampled symbols to a set of n decoded symbols.

11. The communication system of claim 1, wherein a maximum-likelihood estimation is performed with respect to the set of decoded symbols.

12. A transmitter configured to conveying a set of symbols to a receiver faster than Nyquist, the transmitter comprising the following circuits:
   a precoder configured to generate a set of precoded symbols from a set of input symbols by performing a matrix operation with a precoding matrix;

a pulse filter configured to generate a transmission signal to be transmitted over the transmission channel as a function of the precoded symbols, the transmission signal comprising a sequence of pulses having a pulse form $g_T$, wherein the pulses are separated by a time distance $\rho T$, wherein T is an intermediate time for orthogonal pulse transmission with respect to the pulse form $g_T$, and $\rho$ is an acceleration factor having a value between 0 and 1;

wherein the matrix elements of the precoding matrix are dependent on a property of the pulse form $g_T$.

13. The transmitter of claim 12, wherein the matrix elements are further dependent on an acceleration factor $\rho$, the acceleration factor being adapted to be used by the pulse filter to decrease the symbol delay time below the Nyquist delay time, wherein the acceleration factor $\rho$ is a value between 0 and 1.

14. The transmitter of claim 13, wherein the pulse filter is configured to perform the following operation onto a number of n input symbols $a_n$:

$$s(t) = \sum_n a_n \cdot \sqrt{\rho}\, g_T(t - n\rho T).$$

15. The transmitter of claim 14, wherein the matrix of the precoder is derived from a matrix G, the matrix elements of the matrix G being calculated as:

$$G_{m,n} = \int_{-\infty}^{\infty} \sqrt{\rho}\, g_T(t - n\rho T) \cdot \sqrt{\rho}\, g_T(t - m\rho T)\, dt$$

with $1 < n \le N$ and $1 < m \le N$ and N being an integer value $>1$.

16. The transmitter of claim 15, wherein the matrix P of the precoder is an inverse square root matrix $G^{-1/2}$ of the matrix G.

17. The transmitter of claim 15, wherein the matrix P of the precoder relates to a matrix G as follows:

$$G = PSP^*$$

wherein P, P* and S are matrixes, wherein the matrix P* denotes the transpose conjugate to the matrix P, and the matrix S is a singular value matrix, wherein all matrix elements except the elements of the main diagonal equal zero.

18. A receiver adapted for detecting a set of symbols from a transmission signal transmitted by a transmitter, the receiver comprising the following circuits:
a receiver filter configured to receive a transmission signal comprising a sequence of pulses having a pulse form $g_T$, wherein the pulses are separated by a time distance $\rho T$, wherein T is an intermediate time for orthogonal pulse transmission with respect to the pulse form $g_T$, and $\rho$ is an acceleration factor having a value between 0 and 1;
a decoder configured to generate a set of decoded symbols as a function of set of the sampled symbols by means of operation with a decoding matrix, wherein the matrix elements of the decoding matrix are selected in dependency of a property of the pulse form.

19. The receiver of claim 18, wherein the receiving filter is matched to a pulse filter of a transmitter; wherein the transmitter is adapted to perform a precoding with a precoding matrix; wherein both the precoding matrix and the decoding matrix are inverse square root matrices $G^{-1/2}$ of a matrix G; and wherein the elements of the matrix G are dependent on the pulse form $g_T$, the intermediate time T, and the acceleration factor $\rho$.

20. The receiver of claim 19, wherein the precoder matrix and the decoder matrix are derived from a decomposition of the matrix G with $G = L\, L^T$, wherein L is a lower triangular matrix with all matrix elements above the main diagonal being zero and $L^T$ is a transpose conjugate to the matrix L, wherein the decoder is adapted to apply an inverse matrix $L^{-1}$ of the lower triangular matrix L.

21. A user equipment adapted for communication with a base station of cellular radio network, the user equipment comprising at least one of:
a transmitter comprising the following circuits:
a precoder configured to generate a set of precoded symbols from a set of input symbols by performing a matrix operation with a precoding matrix;
a pulse filter configured to generate a transmission signal to be transmitted over the transmission channel as a function of the precoded symbols, the transmission signal comprising a sequence of pulses having a pulse form $g_T$, wherein the pulses are separated by a time distance $\rho T$, wherein T is an intermediate time for orthogonal pulse transmission with respect to the pulse form $g_T$, and $\rho$ is an acceleration factor having a value between 0 and 1;
wherein the matrix elements of the precoding matrix are dependent on a property of the pulse form $g_T$;
a receiver comprising the following circuits:
a receiver filter configured to receive the transmission signal comprising the sequence of pulse forms $g_T$, wherein the pulses are separated by the time distance $\rho T$, wherein T is the intermediate time for orthogonal pulse transmission with respect to the pulse form $g_T$, and $\rho$ is the acceleration factor having the value between 0 and 1;
a decoder configured to generate a set of decoded symbols as a function of set of the sampled symbols by means of operation with a decoding matrix, wherein the matrix elements of the decoding matrix are selected in dependency of a property of the pulse form.

22. A base station of a radio access network configured to communication with user equipment, the base station comprising at least one of:
a transmitter comprising the following circuits:
a precoder configured to generate a set of precoded symbols from a set of input symbols by performing a matrix operation with a precoding matrix;
a pulse filter configured to generate a transmission signal to be transmitted over the transmission channel as a function of the precoded symbols, the transmission signal comprising a sequence of pulses having a pulse form $g_T$, wherein the pulses are separated by a time distance $\rho T$, wherein T is an intermediate time for orthogonal pulse transmission with respect to the pulse form $g_T$, and $\rho$ is an acceleration factor having a value between 0 and 1;
wherein the matrix elements of the precoding matrix are dependent on a property of the pulse form $g_T$ filter;
a receiver comprising the following circuits:
a receiver filter configured to receive a transmission signal comprising the sequence of pulse forms $g_T$, wherein the pulses are separated by the time distance $\rho T$, wherein T is the intermediate time for orthogonal pulse transmission with respect to the pulse form $g_T$, and $\rho$ is the acceleration factor having the value between 0 and 1;

a decoder configured to generate a set of decoded symbols as a function of set of the sampled symbols by means of operation with a decoding matrix, wherein the matrix elements of the decoding matrix are selected in dependency of a property of the pulse form.

23. A method, performed in a transmitter adapted for conveying a set of symbols to a receiver over a transmission channel, the method comprising:

generating a set of precoded symbols as a function of the input symbols by performing a matrix operation with a precoding matrix;

generating a transmission signal comprising a sequence of pulse forms $g_T$ of the set of precoded symbols, wherein the pulses are separated by a time distance $\rho T$, wherein T is an intermediate time for orthogonal pulse transmission with respect to the pulse form $g_T$, and $\rho$ is a value between 0 and 1;

wherein the matrix elements of the precoding matrix are selected in dependency of a property of the pulse form $g_T$.

24. The method of claim 23, wherein the matrix elements of the precoding matrix are further selected dependent on an acceleration factor $\rho$, the acceleration factor being adapted to be used by the pulse filter to decrease the symbol delay time below the Nyquist delay time, wherein the acceleration factor $\rho$ is a value between 0 and 1.

25. The method of claim 24, wherein the transmission signal is generated as following from a number of n input symbols:

$$s(t) = \sum_n a_n \cdot \sqrt{\rho} \, g_T(t - n\rho T).$$

26. The method of claim 25, wherein the matrix elements of the precoding matrix are generated in dependency of a matrix G, the matrix elements of the matrix G being calculated as:

$$G_{m,n} = \int_{-\infty}^{\infty} \sqrt{\rho} \, g_T(t - n\rho T) \cdot \sqrt{\rho} \, g_T(t - m\rho T) dt$$

with $1 < n \leq N$ and $1 < m \leq N$ and N being an integer value $>1$.

27. The method of claim 26, wherein the precoding matrix of is an inverse square root matrix $G^{-1/2}$ of the matrix G.

28. The method of claim 26, wherein the precoding matrix P relates to the matrix G as follows:

$$G = PSP^*$$

wherein P, P* and S are matrixes, wherein the matrix P* denotes the transpose conjugate to the matrix P, and the matrix S is a singular value matrix, wherein all matrix elements except the elements of the main diagonal equal zero.

29. A method, performed in receiver adapted for detecting a set of symbols from a transmission signal transmitted by a transmitter, the method comprising:

receiving a transmission signal comprising a sequence of pulse forms $g_T$, wherein the pulses are separated by a time distance $\rho T$, wherein T is an intermediate time for orthogonal pulse transmission with respect to the pulse form $g_T$, and $\rho$ is an acceleration factor with a value between 0 and 1;

generating a set of sampled symbols from transmission signal by means of a receiver filter; and generating a set of decoded symbols as a function of set of the sampled symbols by means of operation with a decoding matrix, wherein the matrix elements of the decoding matrix are selected in dependency of a property of the pulse form.

30. The method of claim 29, wherein a receiving filter of the receiver is matched to a pulse filter of the transmitter; wherein the transmitter performs a precoding with a precoding matrix; wherein both the precoding matrix and the decoding matrix are inverse square root matrices $G^{-1/2}$ of a matrix G; and wherein the elements of the matrix G are dependent on the pulse form $g_T$, the intermediate time T, and the acceleration factor $\rho$.

31. The method of claim 30, wherein the precoder matrix and the decoder matrix are derived from a decomposition of the matrix G, with $G = L L^T$, wherein L is a lower triangular matrix with all matrix elements above the main diagonal being zero and $L^T$ is a transpose conjugate to the matrix L, wherein the decoder applies an inverse matrix $L^{-1}$ of the lower triangular matrix L.

* * * * *